United States Patent [19]

Hart

[11] 3,845,500

[45] Oct. 29, 1974

[54] HEAD TO TRACK ALIGNMENT IN A ROTATING HEAD MAGNETIC TAPE UNIT

[75] Inventor: Gary A. Hart, Boulder, Colo.

[73] Assignee: International Business Machines Corporation, Armonk, N.Y.

[22] Filed: Nov. 12, 1973

[21] Appl. No.: 415,080

[52] U.S. Cl. .......................... 360/77, 360/76, 360/73
[51] Int. Cl. .......................................... G11b 21/10
[58] Field of Search .............. 360/73, 77, 76, 75, 70

[56] References Cited

UNITED STATES PATENTS

| | | | |
|---|---|---|---|
| 3,666,897 | 5/1972 | Harr | 360/84 |
| 3,686,649 | 8/1972 | Behr | 360/77 |

*Primary Examiner*—Stanley M. Urynowicz, Jr.
*Assistant Examiner*—Alan Faber
*Attorney, Agent, or Firm*—Francis A. Sirr

[57] ABSTRACT

The position of a length of magnetic recording tape, adjacent a rotating head device is servo controlled to accurately position a transverse tape data track in alignment with the head path. The tape includes a longitudinal servo track. A portion of the servo track is read by the rotating head as it sweeps transversely across the tape. The servo track is formed as a constant frequency pattern having periodic sync marks which define the center of a data track. The rotating head signal constitutes a clock which is used to drive an up/down counter as the head sweeps across the servo track. The counter's counting state changes as the head sweeps the servo track, such that the residual count, which remains after the head leaves the servo track, is a measure of the magnitude and direction of head-to-track alignment.

22 Claims, 12 Drawing Figures

HEAD TO TRACK ALIGNMENT IN A ROTATING HEAD MAGNETIC TAPE UNIT

BACKGROUND AND SUMMARY OF THE INVENTION

This invention relates to the field of magnetic telegraphones, and more specifically to magnetic tape units employing one or more rotating heads which record and/or reproduce machine-convertible information while moving in transducing relationship with a magnetic web or tape, this information being oriented as magnetic domains to form information tracks which extend generally transverse to the longitudinal tape length.

Rotating head magnetic tape units are widely known. In one form a generally cylindrical mandrel or drum includes a rotating headwheel which carries one or more read/write heads. The magnetic tape engages the mandrel at one point, makes a helical wrap about at least a portion of the mandrel, and exits the mandrel at a point which is both axially and circumferentially spaced from the entrance point. The angle of helical tape wrap can vary in accordance with design choice, but is usually between 180° and 360°. The headwheel rotates so as to sweep its magnetic head or heads transversely across the tape. The angle at which the head enters and exits the tape may vary, in accordance with design choice, from slightly less than 90° to a small angle, such as 15°.

Another form of device is one wherein the headwheel is associated with a tape guiding structure which bends the tape transversely into an arcuate shape that conforms to the circumferential shape of the headwheel. In this device the tape travels in a generally straight line past the headwheel, and is transversely bent by the associated guides as it enters the headwheel area.

The present invention finds utility with either aforementioned type of device, and has been found particularly useful with the helical wrap device.

A major problem encountered in the aforementioned devices is that of establishing and maintaining accurate positional alignment between the path of the headwheel and the tape's transverse data track. This is particularly true when a data track is written on one tape unit and later read by another tape unit.

To facilitate servo control the the tape's position, so as to maintain proper head/track alignment, the tape is provided with one or more longitudinal servo tracks. Such a track functions to identify the position at which the rotating head should enter and/or exit the tape in order for the head to trace the proper transverse path across the tape.

One such prior art device includes an edge-disposed control track having servo information in the form of gaps. This control track, including the gaps, is read by the rotating head. The control track, and the gaps, provides a means for measuring head/track alignment.

The present invention is an improved servo apparatus and means of this general type whereby the rotating head cooperates with a unique tape servo track or format to measure and determine head/track alignment.

Track following techniques are also known in the art of disc file rotating magnetic memory. In one known arrangement a circular control track is formed by interlacing trapezoid patterns such that the time for the control head to cross adjacent trapezoids is equal only when the control head moves down the center of the control track.

Prior art devices generally assume that the head is moving at a known constant speed. If the head speed changes, or is constant at a different speed than expected, an error results and proper alignment may be indicated when an alignment error in fact exists.

The present invention eliminates such errors by the expedient of counting the cycles of a clock means, which in the preferred embodiment is formed by the servo track format data pattern itself, this counting being controlled by the relationship of the rotating head to the servo track sync marks.

Specifically, the present invention provides a continuously longitudinal servo track having a format comprising a constant frequency pattern. This pattern includes periodic sync marks, for example the absence of a magnetic pattern, or preferably a double frequency pattern. These sync marks define the position of a transverse data track. As the rotating head sweeps across the servo track, on its way to a data track, the servo track constant frequency pattern is counted. This counting mode is not sensitive to either the head speed or to changes in head speed during the accumulation of a count.

In one form of the present invention a single sync mark defines the center of one or more data tracks. The head signal enables a counter to increment until the sync mark is detected, whereupon the counter begins decrementing. If the rotating head is properly aligned with the data track, the counter is at a known number, for example zero, when the head leaves the servo track. If an alignment error exists, the counter contains a different number when the head leaves the servo track, the magnitude of this residual count is a measure of both the magnitude and sense of such misalignment.

In another form of the present invention two sync marks bracket the center of a data track. The detection of the first sync mark enables the counter to begin counting. When a maximum amplitude head signal, or alternatively a high threshold lead signal, is detected the counter begins decrementing. When the second sync mark is detected the counter is inhibited. The residual count is again indicative of both the magnitude and sense of any misalignment.

The foregoing and other objects, features, and advantages of the invention will become apparent from the following more particular description of the preferred embodiment, as shown in the accompanying drawing.

DESCRIPTION OF THE PREFERRED EMBODIMENTS

Figures 1, 2:
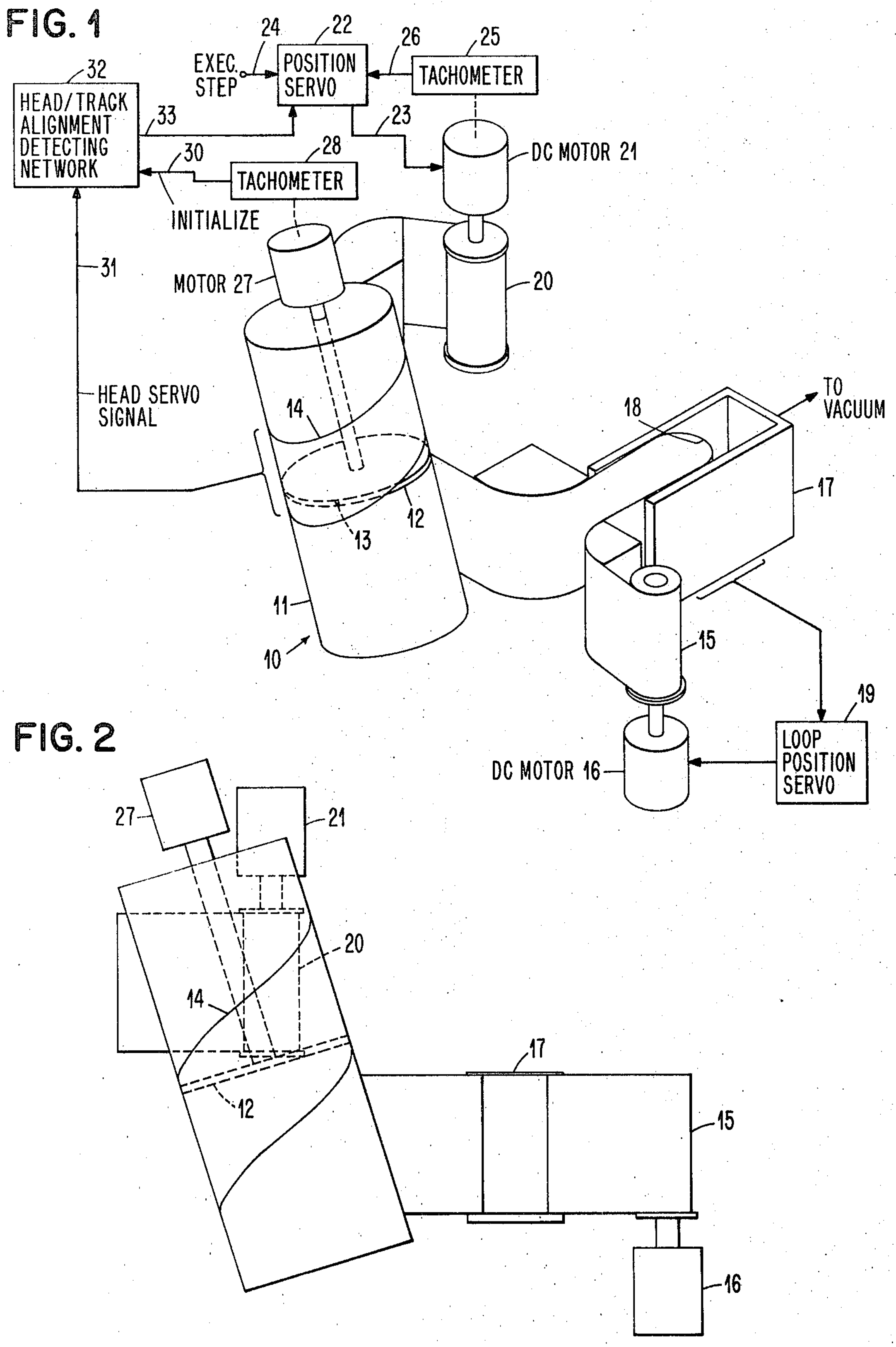
FIG. 1 discloses a rotating head magnetic tape unit whose take-up spool DC motor is controlled in accordance with the present invention.
FIG. 2 is another view of FIG. 1's tape path.

FIG. 1 discloses a helical wrap rotating head magnetic tape unit incorporating the present head-to-track alignment servo invention. More particularly, this device may be of the type more completely described in the co-pending application of P. J. Arseneault et al, Ser. No. 375,966, filed July 2, 1973, and commonly assigned. As more particularly described therein, this rotating head magnetic tape unit includes a tape processing station 10 in the form of a two-section mandrel 11 having an intermediate rotating headwheel 12 which carries a magnetic transducer or head 13. A length of tape 14 is helically wrapped about the center of mandrel 11 and head 13 traces a transverse path across this length of tape.

A tape supply is contained on supply spool 15. This spool is controlled by direct current motor 16. As tape leaves spool 15, a length of the tape is maintained in vacuum column 17. This vacuum column serves to maintain one end of the processing station's tape under constant tension. Tape loop 18, contained within the vacuum column, is position-monitored by loop position servo 19. This servo in turn controls the energization of motor 16 to maintain an optimum loop length within the column. This loop position sensor, which may of the type described in U.S. Pat. No. 3,122,332 to F. G. Hughes, Jr., provides bidirectional and variable magnitude energization of motor 16, thereby maintaining loop 18 at an optimum position, as the tape moves in either direction relative to supply spool 15. The other end of the tape length 14 which extends through tape processing station 10 is maintained under tension by way of take-up spool 20 and direct current spool motor 21.

The present invention will be described in the environment of an incrementing tape unit, that is a tape unit which produces step-by-step rotation of spool 20, maintaining the tape stationary adjacent headwheel 12 as a read/write function is performed by head 13. However, the present invention is not to be restricted to this configuration since, generically, this configuration can be defined as one in which the tape motion is very slow when compared to the motion of head 13. More particularly, the linear speed of head 13 relative to stationary tape 14 is approximately 1,000 inches per second. Within the teachings of the present invention, the tape section 14 may remain stationary as the head sweeps the tape, or may move at a relatively low speed, such as, for example, 10 inches per second.

The incremental or step-by-step positioning of tape section 14 relative to the path of headwheel 12 is controlled by position servo 22 whose output 23 is operable to energize motor 21. More particularly, position servo 22 receives a request to execute a given movement step on conductor 24. This input signal results in energization of motor 21. Motor tachometer 24 provides a closed loop servo feedback on conductor 26 to which the requested step command is compared. As a result, motor energization is terminated upon the completion of the requested step. More particularly, this above-described servo apparatus may be as described in the co-pending application of H. C. Jackson, Ser. No. 391,405, filed Aug. 24, 1973, and commonly assigned.

Headwheel 12 is driven by motor 27 and rotates at a constant speed. This motor also controls the rotation of tachometer or encoder 28. This tachometer functions to determine the instantaneous rotational position of head 13 in its 360° path. With reference to FIG. 2, it can be seen that helical tape wrap 14, about mandrel 11, includes a gap 29. At this rotational position, the head is not cooperating with the tape, but rather is moving at a high speed toward an edge of the tape, preparatory to beginning a transverse sweep across the tape. One of the functions of tachometer 28 is to provide an output signal on conductor 30 indicating that head 13 is about to begin a sweep across the helical tape wrap.

As will be apparent from the following description, the present invention provides a head envelope signal on conductor 31, which signal is provided as an input to head/track alignment detecting network 32. This network is effective to originate a head/track alignment error, if one exists, on conductor 33. This signal controls fine positioning of motor 21 by way of position servo 22, to correct any error in alignment between the path of headwheel 12 and a particular transverse data path carried by the helical wrap of tape.

Figure 3:
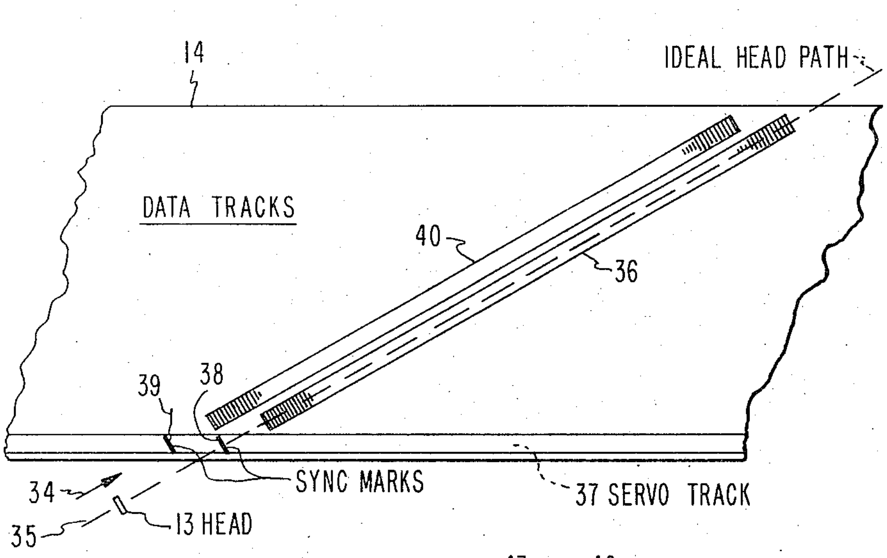
FIG. 3 shows a simple form of the tape's transverse data track and longitudinal servo track format.

FIG. 3 shows in diagrammatic form the tape's data track and servo track format, according to the present invention. In this arrangement, head 13 is shown moving in the direction of arrow 34 along the ideal head path identified by broken line 35. This head path is termed "ideal" in that it coincides with the center of transverse data track 36. Thus, as head 13 follows path 35, the data contained within track 36 will be accurately transduced, this term including either the read or the write function.

The lower edge of tape 14, that is the tape's edge first encountered by head 13, includes a single servo track 37 having distinctive data patterns in the form of sync marks 38 and 39. Sync mark 38 identifies the physical location of data track 36 whereas sync mark 39 identifies the physical location of adjacent data track 40. While not shown in FIG. 3, substantially the entire length of tape on reel 15 includes a large number of such closely packed data tracks. Servo track 37 includes a format having distinctive sync marks, one of which identifies each of the transverse data tracks.

While the present invention is not to be limited thereto, the preferred form of the present invention includes a supply of tape 15 having a prerecorded servo track 37 and a blank data track area. As the tape's data track area is filled, each data track is placed in the correct position by first reading the servo track, and more particularly the position of a sync mark relative to the path of head 13. If an alignment error exists, slight adjustment of the tape occurs, to achieve ideal head path 35 prior to enabling the write function of the magnetic tape unit. As will be appreciated by those skilled in the art, servo track 37 generally comprises a format of distinctive magnetic states which are positioned to identify the physical location of each of the transverse data tracks.

Figures 4, 5:
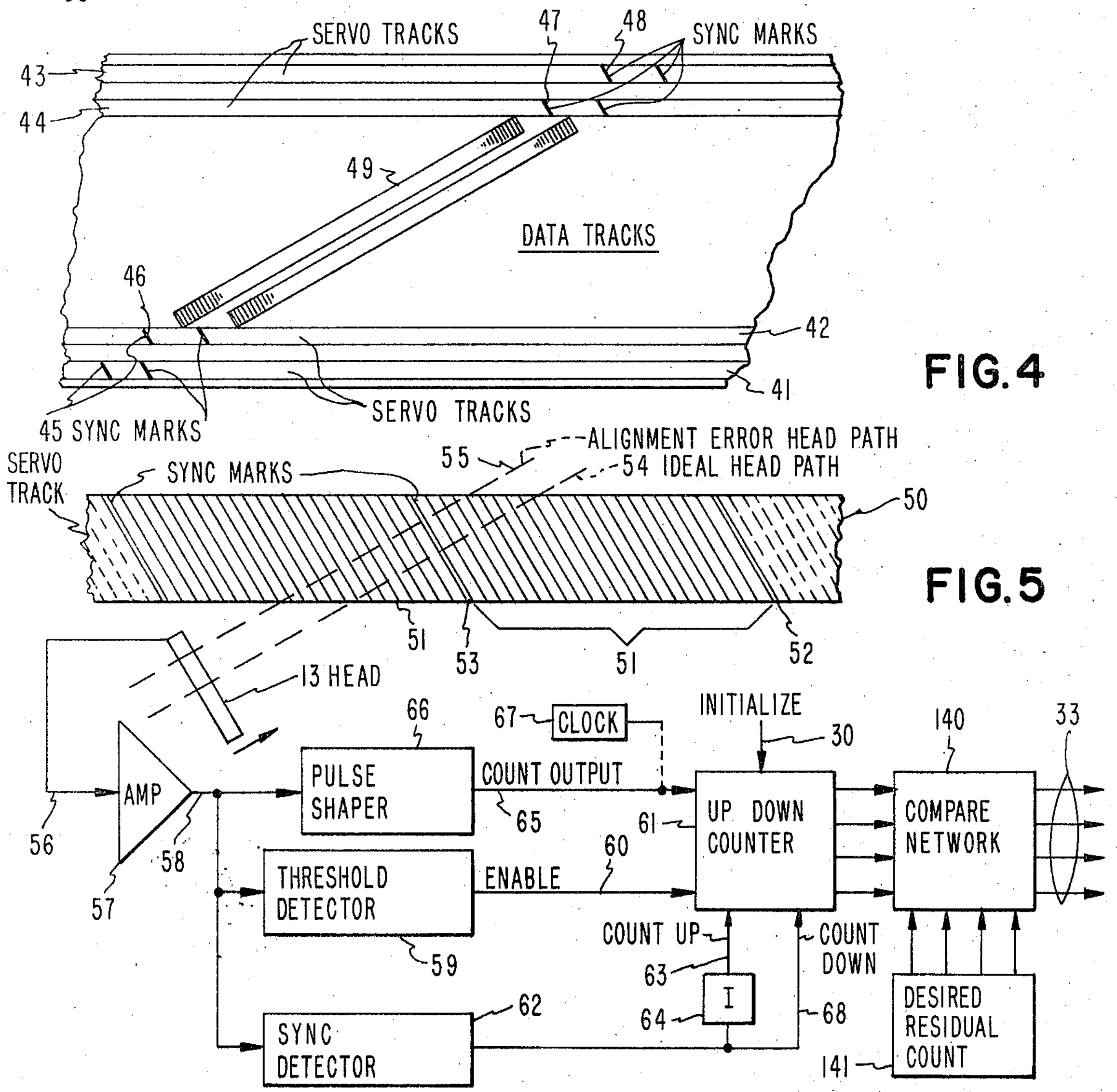
FIG. 4 shows another form of tape format having two servo tracks on each edge of the tape, to facilitate redundant sensing to head-to-track alignment and to facilitate measurement of the skew relationship between the head's path and the data track.
FIG. 5 is an enlarged view of the tape's servo format, FIGS. 3 and 4, showing this format associated with the rotating head and a head/track alignment detecting network constructed in accordance with the present invention.

FIG. 4 shows another form of a servo format, generic to FIG. 3, wherein redundant sensing of head-to-track alignment can be accomplished, and wherein the skew relationship between the head's path and a data track can be measured. More specifically, this tape format includes two servo tracks 41 and 42 located near the bottom tape edge and two servo tracks 43 and 44 located near the upper tape edge. These servo tracks are identical, with the exception that they are offset, one from the other. Thus, four sync marks 45–48 are used to provide redundant sensing of the relative position of the head path and the path of data track 49. Likewise, as will be explained with reference to FIG. 12, the position of the head as it enters the tape, at sync marks 45 and 46, can be compared to the position of the head as it exits the tape, at sync marks 47 and 48, to provide a measure of the skew of the head track relative to the data track.

FIG. 5 discloses an enlarged view of the tape's servo format more generally disclosed in FIGS. 3 and 4, and additionally shows the details of one embodiment of FIG. 1's head/track alignment detecting network. In this figure the servo track is identified by reference numeral 50. The servo track is made up of two distinctively different data patterns. Repeating data pattern 51 is a constant frequency data pattern. Each data pattern 51 begins and ends with a second distinctive data pattern, namely, marks patterns 52 and 53.

In FIG. 5's embodiment of the present invention, the center of head 13, when following ideal head path 54, crosses the center of sync mark 53. If head 13 is misaligned with the transverse data track which is identified by sync mark 53, then the head path would be such as identified, for example, by broken line 55. In the event of this misalignment, the mandrel's length of tape 14, and thereby servo track 50, must be moved a small step to the left, to bring the center of the head's path into coincidence with the center of sync mark 53.

Within the teachings of the present invention, the servo track sync marks, two of which are identified as 52 and 53, may be double frequency data patterns, or they may alternatively, be any other type of data pattern, or absence of data, which is distinctively different than the constant frequency data pattern 51.

Furthermore, while the present invention shows a single head 13 being used to read the servo track data format, it is recognized that head 13 may be a dual gap head, having both a read and a write gap, and that either or both of these heads may be employed to read the tape's servo format.

By way of a specific example, the physical head dimensions, in a particular embodiment of the present invention, were such that the head gap width, measured normal to its direction of travel, was 0.015 inch. The length of sync marks 52 and 53 as well as the constant frequency data pattern, again measured normal to the direction of head travel, is preferably also equal to 0.015 inch. The spacing between the individual magnetic transitions making up constant frequency pattern 51, measured in the direction of head travel, was 0.0006 inch.

Referring now to the head/track alignment detecting network of FIG. 5, the signal output of head 13, as it sweeps across servo track 50, appears on conductor 56. This output signal is applied to the input of amplifier 57 and appears at amplifier output conductor 58. When this signal amplitude reaches a minimum threshold magnitude, this threshold is detected by threshold detector 59 and a signal appears on conductor 60. This signal enables operation of up/down (increment/decrement) counter 61. Since head 13 has just penetrated the lower leading edge of servo track 50, a sync mark has not been detected at this time and output 61 of sync detector 62 is not present. Thus, conductor 63 is enabled by way of inverter 64 so as to place counter 31 in a condition to count up.

As head 13 continues its sweep across servo track 50, counter 61 is driven by output 65 of pulse shaper 66. Pulse shaper 66 is effective to shape the constant frequency signal which is being provided from the servo track's constant frequency portion 51. Thus, this constant frequency portion constitutes a clock means which is effective to increment the counter.

In an alternative embodiment of the present invention, the count input to counter 61 may be provided by a constant frequency clock 67.

When head 13 encounters sync mark 53, sync detector 62 is enabled and its output 61 becomes active, thus placing counter 61 in a count down or decrement mode, by way of conductor 68. The count magnitude contained within counter 61 at this instant is dependent upon the relative alignment between head 13 and the data track identified by sync mark 53. For example, when head 13 follows ideal head path 54, the count within counter 61 will be smaller than had it been following alignment error path 55. In any event, as head 13 continues to sweep servo track 50, constant frequency portion 51 on the downstream side of sync mark 52 con tinues to be counted. However, counter 61 now counts down. As head 13 leaves servo track 50, the minimum signal threshold is again detected by detector 59 and counter 61 is inhibited from further counting.

A residual count is now trapped within counter 61. The magnitude and sense of this count are a measure of the magnitude and direction of misalignment between the head path and the data track whose position is identified by sync mark 53. For example, if the initialized state of counter 61 were a count of zero, the counter's trapped or residual count will be zero when the head follows ideal head path 54. A positive residual count indicates that the alignment error was such as shown by track 55. A negative residual count indicates that the head followed an alignment error path displaced on the other side of head path 54 from path 55.

This residual count is presented to compare network 140 where it is provided as an input to position servo 22, FIG. 1, to produce whatever fine tape positioning is necessary in order to achieve accurate head-to-track alignment for proper transducing of the data track magnetic states by head 13. Within the teachings of the present invention, an alternative arrangement to that of using networks 140 and 141 is to preset counter 61 to a count which will result in a known residual count when alignment is proper, and will result in a residual count which may be used directly as an input to position servo 20.

While sync marks 52 and 53 are ideally centrally aligned with their respective data tracks, it is within the teachings of the present invention to produce a known misalignment, such that the desired residual count is not zero, but is a discrete number. In this event, a comparison is made between the actual residual count and the desired residual count, in order to detect the head/track alignment error, if such an error exists.

Figure 6:
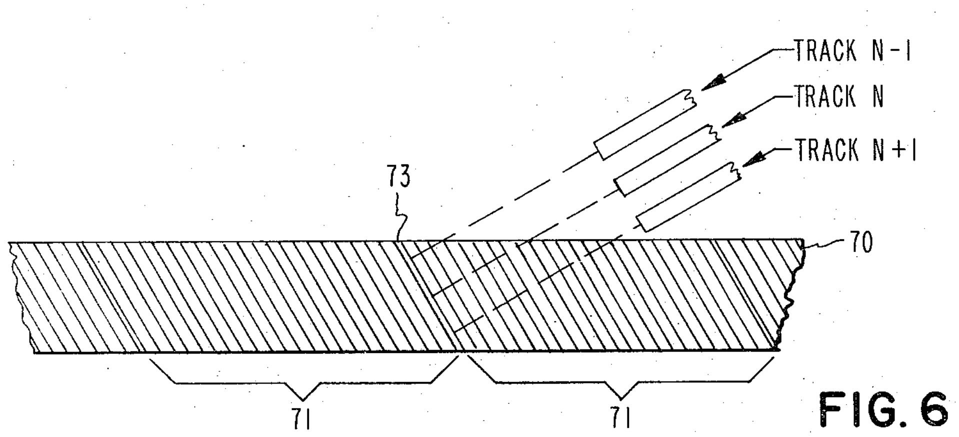
FIG. 6 shows an alternate tape format whereby a single sync mark cooperates with the structure of FIG. 5 to selectively identify one of three data tracks.

Furthermore, it is within the teachings of the present invention to provide a number of relatively narrow data tracks, as shown in FIG. 6, such that each sync mark 73 identifies a plurality, for example 3, data tracks. In such a case, the residual count expected to be trapped in counter 61 would be zero for only the center track N of these three data tracks. The desired residual count for track N+1 is positive whereas that of the N−1 data track is negative. In each case, a network such as FIG. 5's network 140 compares the count actually trapped within counter 61 to the desired residual count 141 associated with the particular data track being followed. In this manner, the proper head/track alignment error is supplied to FIG. 1's position servo 22 to achieve optimum alignment.

Figure 7:
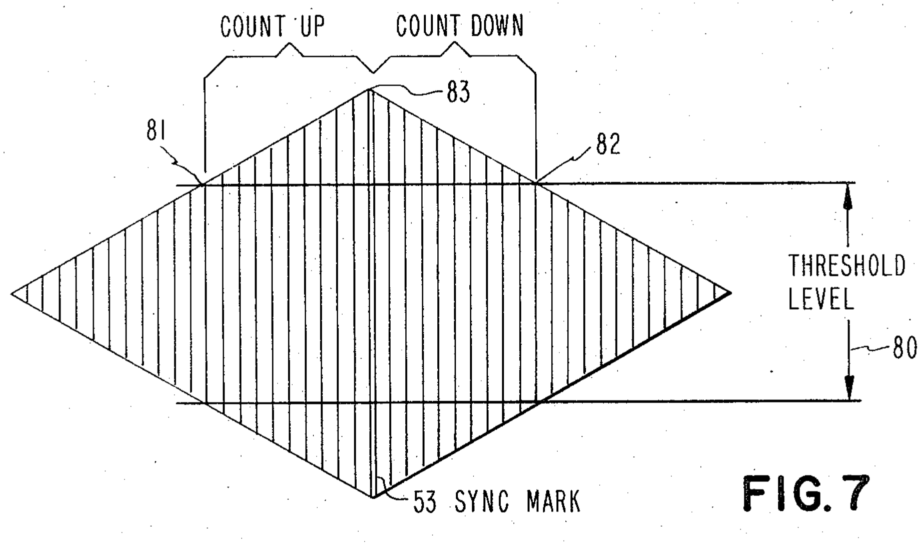
FIG. 7 shows the head signal envelope of FIG. 5 when the head is properly aligned with a data track.

With reference to FIG. 7, this figure shows the head signal derived from head 13, on conductor 56, FIG. 5, when the head follows ideal tape path 54. The threshold level defined by threshold detector 59 is represented by signal band 80. The function of detector 59 is to enable counter 61 whenever the head signal envelope is greater than threshold level 80. Thus, counter 61 begins counting at time 81 and stops counting at time 82. Since the head is following the ideal tape path, sync mark 53 is encountered, half way between times 81 and 82, at time 83. Counter 61 changes its mode of counting, from count up to count down, at time 83. As can be seen in FIG. 7, the total number of clock cycles counted up during time 81, 83 is equal to the total number of clock cycles counted down during time 83, 82. Thus, the residual count trapped in counter 61 is equal to its initial value, for example zero, indicating that the head is properly aligned with the associated transverse data track.

In the present example, the center of sync mark 53 is aligned with the center of the associated data track. As previously mentioned, it is within the teachings of the present invention to intentionally offset sync mark 53 to either side of time 83, such that the expected residual count within counter 61 will be different than the initial count. Also, as explained previously, the gap width of head 13 is equal to the width of sync mark 53, measured normal to the head's path. Thus, a maximum head signal amplitude is instantaneously achieved at time 83. It should also be recognized that this dimensional relationship is not critical. Within the teachings of the present invention, head 13 can, for example, be of a smaller dimension, such that the resulting head signal envelope includes a period of steady-state signal amplitude centered about time 83.

Figure 8:
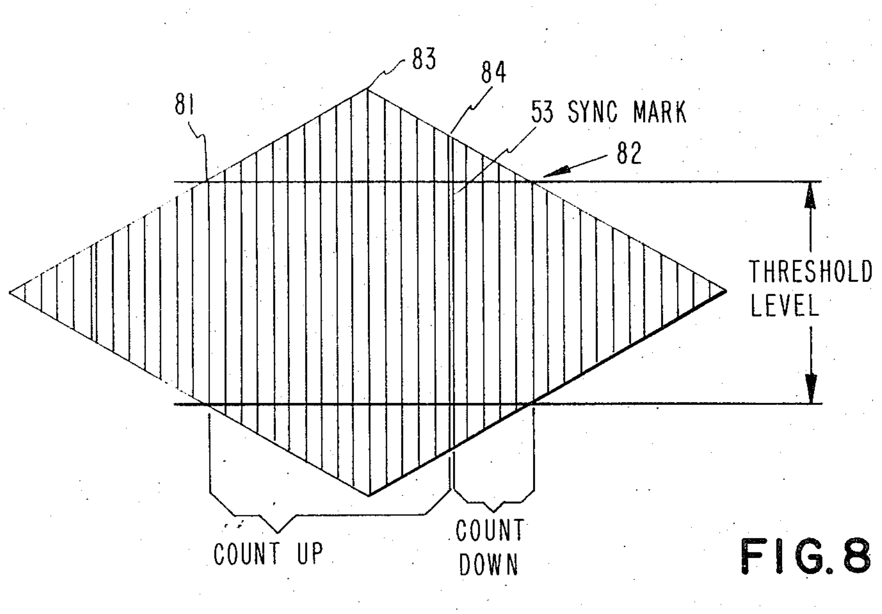
FIG. 8 shows the same head signal envelope when the head is not properly aligned with a data track.

FIG. 8 shows the same head signal envelope, when the head is not properly aligned with the associated data track, as when the head follows the path 55, FIG. 5. In this case, counter 61 again begins counting at time 81 and stops counting at time 82. Likewise, the signal envelope reaches a peak at time 83. However, sync mark 53 is detected at time 84. Thus, counter 61 counts up during time 81, 84 and counts down during time 84, 82. In this condition, the count trapped within counter 61 is not the desired residual count, but rather is a more positive count. The polarity of this count indicates that the tape must be moved to the left from the position shown in FIG. 5. The magnitude of this count indicates the length of the tape movement step which must be executed by FIG. 1's position servo 22 in order to bring the head path properly into alignment with the center of sync mark 53. When this fine positioning step has been completed, FIG. 7's head signal envelope results.

Figure 9:
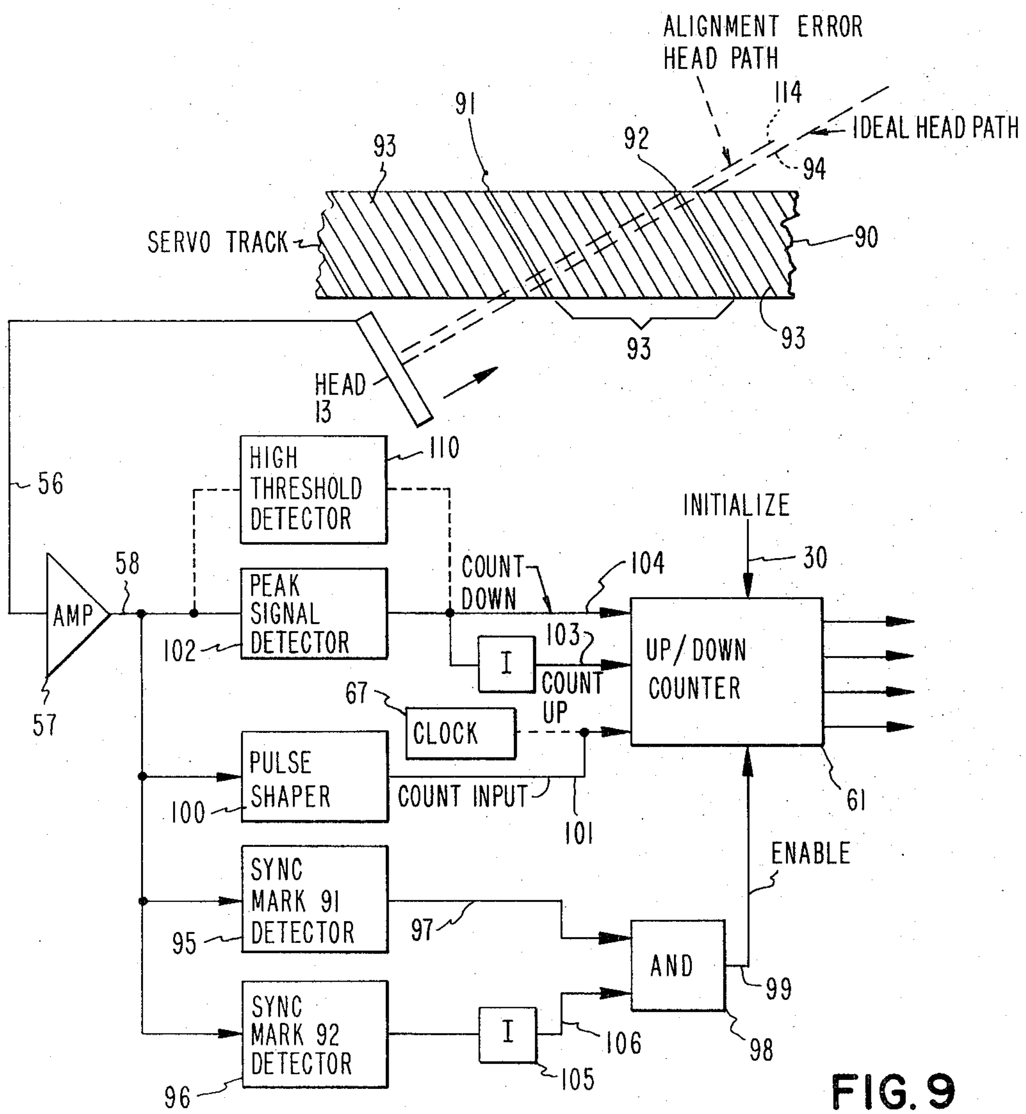
FIG. 9 is an enlarged view of a second tape servo format, showing this format associated with the rotating head and a second head/track alignment detecting network constructed in accordance with the present invention.

FIG. 9 shows an enlarged view of a second tape servo format 90 in accordance with the present invention. In this servo format, the transverse data track, not shown, is identified by two sync marks 91 and 92. The remaining portions of the servo track include a constant frequency pattern or clock means 93. As rotating head 13 follows ideal head path 94, in proper alignment with the associated transverse data path, the head encounters, in sequence, a first constant frequency pattern 93, sync mark 91, a second constant frequency pattern 93, sync mark 92, and a third constant frequency pattern. The function of the electronic network shown in FIG. 9 is to detect sync mark 91, whereupon counter 61 begins counting the above-mentioned second constant frequency pattern. Next, a peak signal is detected in the read head envelope and the counter changes its mode of counting from up to down. Thereafter, sync mark 92 is detected whereupon the counter is inhibited from further counting. A residual count is now trapped within counter 61 as a measure of head/track alignment.

More specifically, the head signal on conductor 58 is applied to sync mark 91 detector 95 and to sync mark 92 detector 96. When sync mark 1 is detected, conductor 97 becomes active and AND 98 enables counter 61 by way of conductor 99. The head signal on conductor 58 is shaped into a square wave by pulse shaper 100 and provides a count input signal on conductor 101 to drive counter 61. At this time, peak signal detector 102 has not detected a peak in the head signal envelope and, therefore, conductor 103 is operable to place counter 61 in an incrementing or count up mode.

As head 13 continues its sweep across servo track 90, a peak signal appears in the head envelope. This peak signal is detected by detector 102, causing conductor 104 to become active and thereby placing counter 61 in its decrement or count down mode.

As head 13 begins to leave servo track 90, near the end of its servo track sweep, sync mark 92 is detected and detector 96 inhibits further operation of AND 98, by way of inverter 105 and conductor 106. At this time, counter 61 stops counting and a residual count is trapped within the counter, this count being indicative of head/track alignment.

Figure 10:
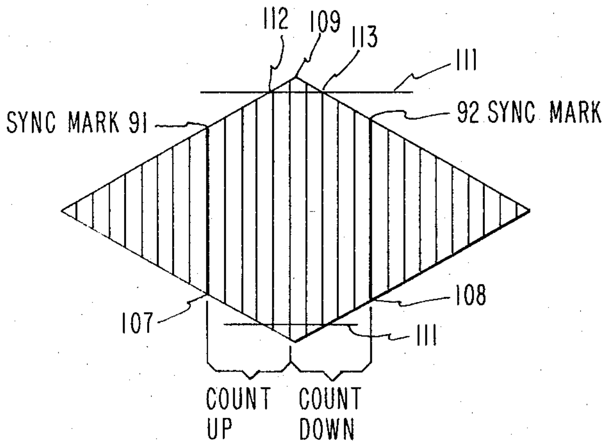
FIG. 10 shows the head signal envelope of FIG. 9 when the head is properly aligned with a data track.

FIG. 10 shows the head signal envelope, as provided by the apparatus of FIG. 9, when the head is properly aligned with the data track and follows ideal head path 94. In this case, sync mark 91 is detected at time 107, whereas sync mark 92 is detected at time 108. The peak signal is detected at time 109 by detector 102. Thus, counter 61 counts up during time 107, 109 and counts down during time 109, 108.

As an alternative, FIG. 9's peak signal detector 102 may be replaced by high threshold detector 110. This detector operates to sense a high threshold, such as 111 of FIG. 10, and to change the counter's counting sense based upon this threshold. In this alternative arrangement, the counter counts up during time 107, 112 and counts down during time 113, 108.

Figure 11:
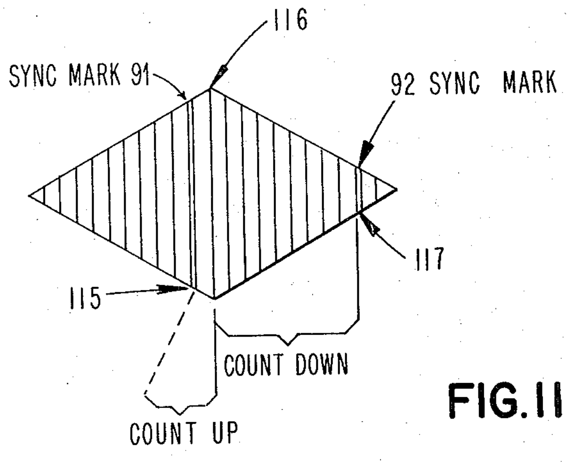
FIG. 11 shows the same head signal envelope when the head is not preperly aligned with a data track.

IN FIG. 11, it is assumed that head 13, FIG. 9, is following the alignment error head path identified by broken line 114. In this case, sync mark 91 is detected by time 115. Counter 61 counts up during time 115, 116, and counter counts down during time 116, 117. The residual count trapped within the counter is now more negative than its initial count. The polarity of this residual count indicates the direction in which the tape must be moved by FIG. 1's position servo 22, whereas the magnitude of this count indicates the magnitude of the tape step which must be executed in order to achieve the desired head signal envelope shown in FIG. 10.

Figure 12:
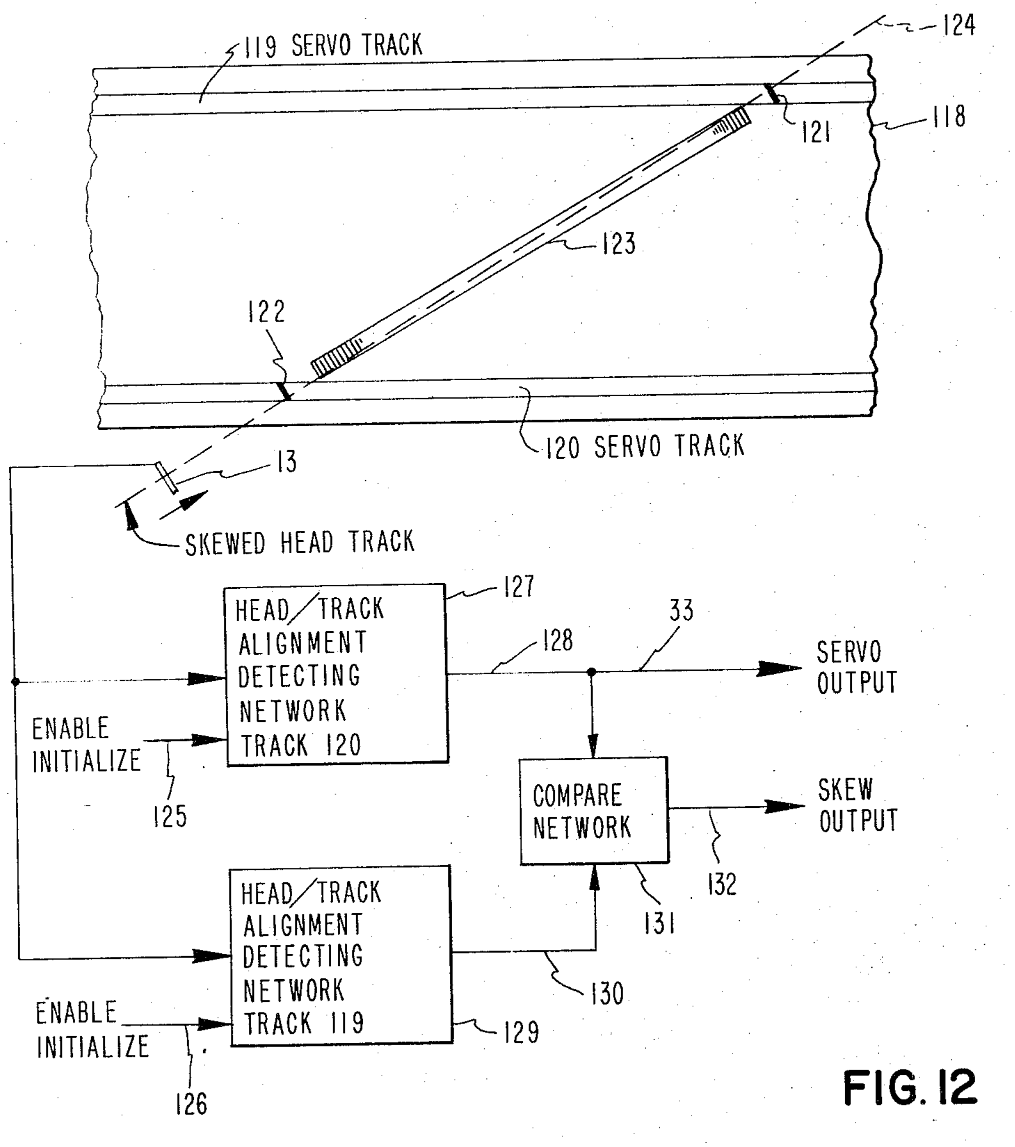
FIG. 12 shows the use of two edge disposed servo tracks and two head/track alignment detecting networks constructed in accordance with the present invention and connected to facilitate both tape servo control and head-to-track skew measurement.

FIG. 12 shows a further embodiment of the present invention wherein magnetic recording tape 118 includes two servo tracks 119 and 120 disposed on opposite edges of the tape to facilitate both tape servo control and head/track skew measurement. These two servo tracks may be any of the above-mentioned specific formats, and for purposes of explanation the servo format shown in FIGS. 3, 4 and 5 wherein a single sync mark 121 and 122 identifies the center of data track 123 has been chosen. In this case, head 13 is shown following a skewed head track, identified by broken line 124. This head track is generally in alignment with data track 123, but is skewed in relation thereto. With reference to FIG. 1, tachometer 28 provides enable and counter initialize signals on lines 125 and 126 when head 13 is in a position to begin its sweep of servo track 120 and to begin its sweep of servo track 119, respectively. Thus, head/track alignment detecting network 127 is operable to sense the head signal envelope during the sweep of servo track 120 and to provide a head/track alignment signal on conductor 128 in response thereto. Likewise, head/track alignment detecting network 129 is operable when the head is sweeping servo track 119 and operates to provide a similar signal on conductor 130.

The signal on conductor 128 provides the servo output of conductor 33, FIG. 1. The signal on conductor 128 is also compared to the signal on conductor 130 by means of compare network 131. If these signals are exactly similar, both in the polarity and the magnitude, no skew exists and compare network 131 provides an output signal indicating this condition on conductor 132. However, with the skew condition indicated in FIG. 12, the count present on conductors 128 and 130 will be dissimilar in polarity and possibly in count magnitude. Compare network 131 senses this dissimilarity and provides a skew output on conductor 132. This skew output may be used to drive an output display, indicating the skew condition, or may be used to accomplish other control functions, not disclosed.

Head/track alignment detecting networks 127 and 129 may be either of the forms shown in FIGS. 5 or 9.

While the invention has been particularly shown and described with reference to preferred embodiments thereof, it will be understood by those skilled in the art that various changes in form and details may be made therein without departing from the spirit and scope of the invention.

What is claimed is:

1. In a rotating head magnetic tape unit, improved means for maintaining head to data track alignment, comprising:

a length of magnetic tape having a longitudinal servo track recorded thereon, said servo track including a constant frequency pattern interrupted by sync marks of a distinctively different pattern which define the physical location of associated transverse data tracks, reading means including said rotating head operable to read a section of said servo track as said head sweeps across said servo track, reversible counter means controlled by said reading means and operable to accumulate a count during said sweep, which count bears a known relationship to said constant frequency pattern, and counter control means controlled by said reading means and operable to change the counting sense of said counter means in accordance with the time of occurrence of said sync marks, such that the residual count in said counter means at the end of said sweep is a measure of the alignment of said head with a data track.

2. The rotating head tape unit defined in claim 1 wherein a single sync mark defines the center of a data track, and wherein said counter control means is operable to change the counting sense of said counter means upon detection of a sync mark.

3. The rotating head tape unit as defined in claim 2 wherein said single sync mark is physically located to define the center of a data track.

4. The rotating head tape unit as defined in claim 3 including tape servo means operable to control tape position in accordance with said residual count.

5. The rotating head tape unit defined in claim 1 wherein two spaced sync marks define the center of a data track, wherein the detection of the first sync mark enables said counter means, wherein the detecting of the second sync mark inhibits said counter means, and wherein a maximum amplitude signal from said rotating head is operable to change the counting sense of said counter means.

6. The rotating head tape unit defined in claim 5 wherein said maximum amplitude signal from said rotating head is detected by a threshold detecting network.

7. The rotating head tape unit defined in claim 6 including tape servo means operable to control tape motion in accordance with said residual count.

8. The rotating head tape unit defined in claim 1 wherein said tape includes redundant servo tracks, each one of which separately defines the physical location of said data tracks.

9. In combination:

a magnetic recording tape having a longitudinal control track recorded thereon, and adapted to have transverse data tracks extending at an angle to the control track, said control track being recorded with a format having sync magnetic states positioned to identify the physical location of the data tracks, a magnetic transducer movable across said tape at an angle corresponding to the angle of said data track, an up/down counter, constant frequency clock means having an output connected to be counted by said counter, counter control means responsive to the output of said transducer as it reads said control track, said control means being operable to enable said counter to begin counting as said head begins to sweep across said control track, to thereafter change the counter's state of counting in accordance with the relationship of said sync magnetic states to the path followed by said transducer, and to thereafter inhibit said counter as said head completes said sweep across said control track, and means operable after said counter is inhibited to decode the residual state of said counter as a measure of the alignment of said transducer with the data track whose position is identified by said sync magnetic states.

10. The combination defined in claim 9 wherein said control track includes a plurality of constant frequency clock magnetic states intermediate said sync magnetic states, and wherein said constant frequency clock means is defined by said clock magnetic states.

11. The combination defined in claim 10 wherein the position of each data track is identified by a single sync magnetic state, wherein said counter is enabled and thereafter inhibited by a minimum signal threshold detector responsive to the output of said transducer, and wherein the counter's state of counting is changed upon the detection of said sync magnetic state.

12. The combination defined in claim 11 wherein each of said single sync magnetic states defines the center of one data track.

13. The combination defined in claim 12 including tape servo means controlled by the residual state of said counter and operable to control the position of said tape in accordance therewith.

14. The combination defined in claim 10 wherein the position of each data track is identified by first and second spaced sync magnetic states, and wherein said counter is enabled by said first sync magnetic state, is inhibited by said second sync magnetic state and the counter's state of counting is changed upon the detection of a high signal amplitude in the output of said transducer.

15. The combination defined in claim 14 including tape servo means controlled by the residual state of said counter and operable to control the position of said tape in accordance therewith.

16. The combination defined in claim 9 wherein said tape includes a plurality of control tracks, each one of said separately defines the physical location of said data tracks.

17. Closed loop tape servo apparatus for use in controlling the relative tape-to-head position in a rotating head, transverse-recording magnetic tape unit, comprising:

a tape processing station having a rotating head, a movable length of tape extending through said station, means applying tension to one end of said tape, motor means applying tension to the other end of said tape, said motor means being servo controllable to change the position of the tape's transvere data tracks adjacent the path of said rotating head, at least one longitudinal servo track recorded on said tape and including distinctive sync patterns identifying the position of each transverse data track, an up/down counter, clock means connected to selectively increment or decrement said counter, control means connected to control said counter and to be controlled by said rotating head, said control means being responsive to the head signal envelope and said sync patterns during the time that the head sweeps across said servo track to cause said counter to count up for a portion of this time and to count down for a portion of this time, the respective time portions being determined by he positional relationship of the servo track's sync patterns to said rotating head path, and servo means connecting the residual count within said counter at the end of said sweep to control the energization of said motor means in a sense to reduce said residual count to a given value.

18. The servo apparatus of claim 17 including means operable to rotate said head at a known constant speed.

19. The servo apparatus defined in claim 18 wherein said clock means includes a constant frequency data pattern as a portion of said servo track.

20. The servo apparatus defined in claim 19 wherein each transverse data track is identified by a single sync pattern, and wherein said counter counts said constant frequency data pattern and changes its state of counting upon the detection of a single sync pattern.

21. The servo apparatus defined in claim 19 wherein each transverse data track is identified by two spaced sync patterns, and wherein said counter means begins counting said constant frequency data pattern upon the detection of the first sync pattern and stops said counting upon the detection of the second sync pattern, the state of counting being changed therebetween upon the detection of a high amplitude signal from said rotating head.

22. The servo apparatus defined in claim 17 including a plurality of longitudinal servo tracks recorded on said tape, each track functioning to independently identify the position of each transverse data tracks.

* * * * *